UNITED STATES PATENT OFFICE 2,679,223

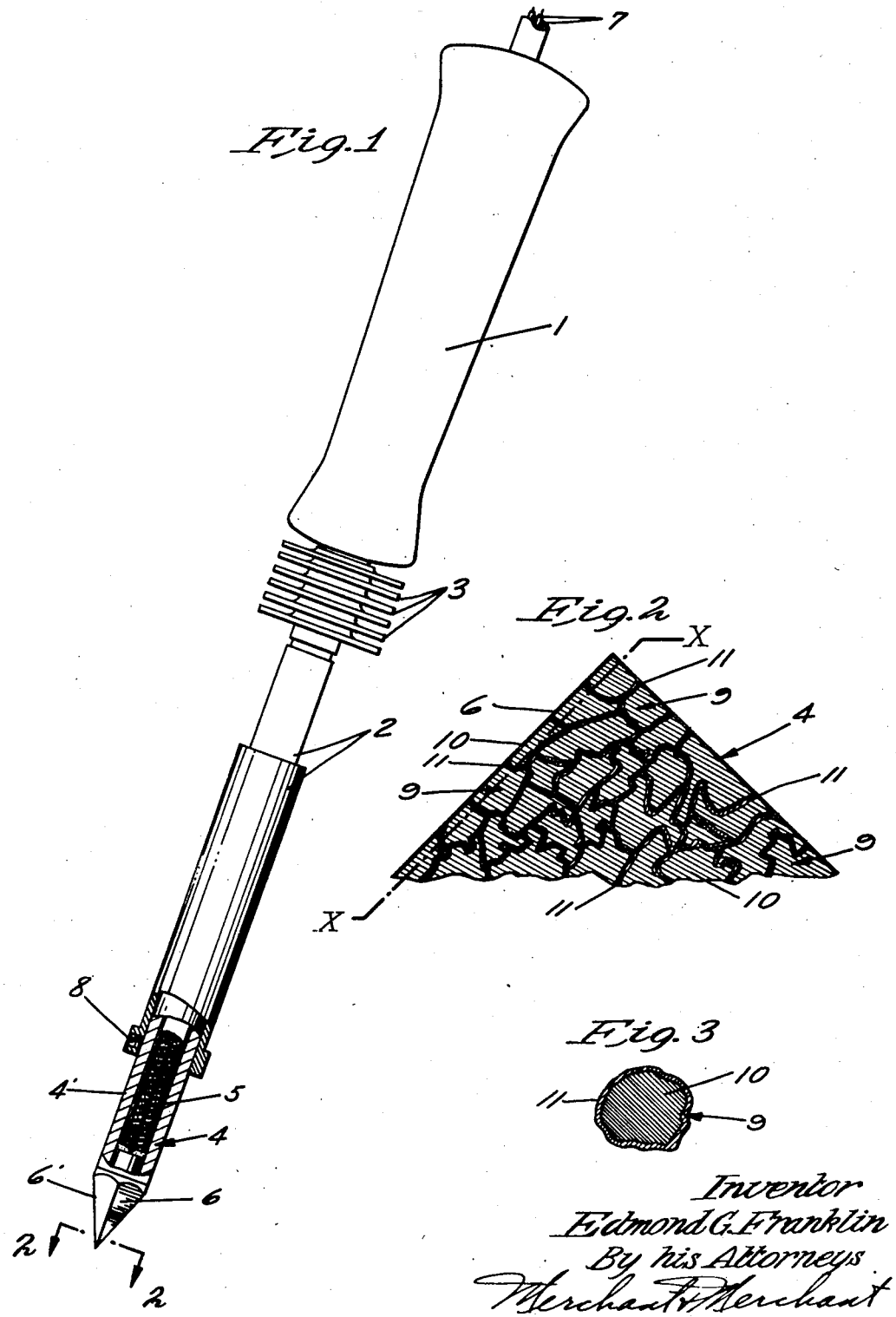

SOLDERING INSTRUMENT

Edmond G. Franklin, Minneapolis, Minn.

Application September 16, 1949, Serial No. 115,967

5 Claims. (Cl. 113—105)

My invention relates to improvements in soldering instruments, and particularly to improvements in that class of soldering instruments variously referred to in the art as soldering irons and soldering coppers; such instruments being used primarily in the electrical and metal working arts for the melting of solder and the application thereof in molten condition to the surface of metal objects to mend the same, or to the junctions between associated metal parts to securely join the same. Before going into the specific objects and advantages of the instant invention, a review of some of the problems involved in connection with soldering instruments, generally, and a review of some of the faults and objections to conventional soldering instruments appears desirable.

Generally and herein the term "solder" is used to designate a metal or metallic alloy used when melted to join metallic surfaces. Generally speaking, there are two types of solder, namely, "soft solders" and "hard solders." Soft solders are those which melt and fuse readily at relatively low temperatures and usually comprise an alloy of lead and tin; and hard solders are those which melt and fuse at relatively high temperatures (usually red heat) and are usually composed of silver alloy. Commercially, soldering instruments of the general character mentioned are most usually used in connection with the so-called soft solders and these solders are all that need be considered for the purpose of understanding the instant invention and the objectives and advantages thereof.

Soldering instruments of the kind described comprise handle-equipped metallic heads or tips, which may be heated by various heat sources, but are now usually heated by self-contained electrical heating elements.

One of the essential requirements of soldering iron tips or heads, generally, is that at least the working surface thereof be of a metal capable of alloying with solder of the type to be used in connection therewith, so that molten solder will adhere to the surface thereof for transfer to the work; this being commonly referred to in the art as "tinning" of the working surface of the soldering head or tip. Another essential characteristic of soldering iron heads or tips, generally, is that they be formed of metal having a high degree of thermal conductivity, so that the heat of the mass will be rapidly transferred to the surface thereof and from thence to the solder and work. A highly desirable characteristic of soldering heads or tips, generally, and one that is in some cases considered essential, is that they be capable of reshaping, as by filing or grinding, to adapt the same to different kinds and varieties of work without adversely affecting the above-noted desirable or essential features. It is for these reasons that soldering instrument heads or tips are now most commonly formed of pure copper, which combines a high degree of thermal conductivity with the ability to alloy with all commonly used solders, is readily reshaped by filing or grinding, and will retain the aforementioned important characteristics when so reshaped. However, these widely used pure copper heads or tips do have one very objectionable characteristic, which is a relatively short service life resulting from the fact that pure copper dissolves quite rapidly in conventional solders of which tin and lead solder is a typical example. In service, this means that such tips rapidly change shape and must be periodically reshaped by filing or grinding, often several times per day, and which reshaping further reduces the mass of the tip and the useful life thereof. This objection to pure copper soldering instrument tips or heads has long been recognized, and several schemes have hitherto been offered for the creation of otherwise satisfactory soldering instrument tips having longer life expectancy than tips formed of solid pure copper or other metal substance having a satisfactory rate of heat conductivity accompanied by an objectionable rate of solubility in solder. Probably the most common of such schemes, at least from a commercial point of view, involves the coating of at least the working surface of a pure copper soldering instrument head or tip with a sheath of pure iron to protect the copper against direct contact with the solder; iron being capable of alloying with solder, to the extent necessary for tinning of the working surface, but having a much lower rate of solubility in solder than copper. Such an iron sheath or coating over the working surface of the soldering head does offer the advantage of greatly extending the working life of the head or tip. However, because iron has a very low rate of thermal conductivity, as compared to copper, such an iron sheath or coating must be made relatively very thin if undue reduction of overall thermal conductivity of the instrument tip or head is to be avoided. Hence, in practice, it has been necessary to make such iron coatings or sheathings over the working surfaces of soldering instrument tips so thin that reshaping of the tip to adapt the same to different jobs has been impossible without cutting through the thin iron sheathings or coating, thereby defeating the purpose thereof.

Generally speaking, it is a primary objective of this invention to provide an improved soldering instrument tip which is devoid of the above-noted objectionable characteristics of conventional soldering instrument tips, such as those made of pure copper, but which retains the advantageous characteristics of conventional soldering iron tips, such as those made of pure copper.

Otherwise stated, it is the primary objective of the instant invention to provide an improved soldering iron tip combining the following desirable characteristics, to wit:

1. High thermal conductivity.
2. The ability to alloy with solder of predetermined kind to the extent necessary to enable plating or tinning of the working surface of the tip with molten solder, this characteristic being present throughout the mass or at least to a sufficient depth below the surface thereof to allow such reshaping as may be necessary to adapt the tip to different work requirements.
3. A much lower rate of solubility in solder than pure copper or other metal substances customarily used in the production of soldering instrument tips; this characteristic also being present throughout the mass of the tip or at least to a depth sufficient to allow such reshaping as may be necessary to adapt the head or tip to different work requirements.

The above and other highly important objects and advantages of the invention will be made apparent from the following specification, claims and appended drawings.

Referring to the drawings:

Fig. 1 is a view in elevation, with some parts broken away and some parts shown in section, of a soldering instrument incorporating one of my improved tips;

Fig. 2 is a very greatly enlarged fragmentary sectional view, taken on the line 2—2 of Fig. 1; and Fig. 3 is a similarly enlarged view of a single coated particle of the kind forming the tip of my improved soldering instrument head.

The soldering instrument shown in Fig. 1 comprises a handle 1 of thermal and electrical insulating material, a tubular metallic shank 2 extending from the handle and provided adjacent thereto with cooling fins 3, the tip-equipped head 4, and an electrical heating element 5. The head 4, in the particular form illustrated, is tubular and contains the electrical heating element 5, which latter is adapted to be energized from a suitable circuit through leads 7. As shown, the head 4 is telescopically applied to the tubular shank 2 and is locked in place by a set screw or the like 8. Although the entire head 4 may be formed in accordance with the instant invention, the same is preferably, and as illustrated, formed of a copper tube 4', which is closed at its outer end by a tip 6, which is pointed or otherwise shaped to form working surfaces 6', the tip 6 being formed in accordance with the invention and being secured to the end of the tube 4' by brazing or the like.

In accordance with the invention, the tip 6 comprises a coherent solid metal mass comprising many metallically coated metallic particles indicated as entireties by 9. Each of these coated metallic particles comprises a core 10 of one metal and a thin plating or coating 11 of another metal, and the coatings 11 of adjacent particles of the mass are directly and metallically bonded or united to one another.

In order to achieve the full advantages of the invention, the metal substance forming the cores 10 of the particles 9 and the metal substance forming the coatings 11 of the particles 9 should both be capable of alloying with solder of predetermined kind, soft lead and tin solder, for example, to the extent necessary to enable plating or tinning of the working surface or surfaces 6' of the tip with molten solder; the metal substance forming the particle cores 10 must have a relatively very high rate of thermal conductivity; and the metal substance forming the particle coatings 11 must have a relatively low rate of solubility in said solder as compared to the metal substance forming the cores 10 of the particles 9. From a practical commercial point of view, pure copper appears to be the most practical metal substance from which to form the particle cores 10 and pure iron appears to be the most practical metal substance from which to form the particle coatings 11. It should be appreciated, however, that the broad objectives of the invention may be achieved through the use of other metals or combinations of metals, some such other combinations being as follows, to wit:

(A) Iron coated silver particles;
(B) Nickel coated copper particles; and
(C) Nickel coated silver particles.

The nature and characteristics of my improved soldering instrument tips will further be made apparent from a consideration of the method or methods by which the same may be produced, the following being an example of a preferred method of production of my improved tips: In accordance with this preferred method, a quantity of powdered metal substance having qualities suitable for forming the cores 10 of the particles 9 is first procured or produced and this may, for the purpose of the instant example, be powdered pure copper. This powdered copper may be produced by various well-known methods or processes, but is preferably electrolytically produced, since the individual particles of electrolytically-produced metallic powder have a certain irregularity of surface contour which has been found advantageous in the subsequent pressing operation. The relative fineness or coarseness of this metallic powder, copper for example, may vary considerably or even greatly, but on the basis of experiments and production to date, may advantageously have an average size of 100 mesh, with some of the individual particles ranging considerably above and below this average mesh size, it being important, however, that the varying particle sizes be thoroughly distributed throughout the mass.

In carrying on this preferred method or process, the individual particles of powdered metal substance are coated or plated with another metal substance, having qualities suitable to provide the protective coatings 11 for the particle cores 10, and for the purpose of the present example, such metal coating substance may be pure iron. While the iron coatings may be applied to the individual particles of powdered metal substance forming the particle cores 10 by different methods, I have found that this step can effectively and satisfactorily be accomplished by electroplating the individual particles of powdered metal with iron or other suitable metallic substance. In practice, I have found that this can be very effectively accomplished by tumbling or otherwise agitating a quantity of copper powder, for example, in the electrolyte during the plating step.

I have found that highly satisfactory results are obtained by electroplating pure electrolytic copper powder of an average mesh size of 100, for example, with pure iron in a solution of ferrous chloride using 3 pounds of ferrous chloride to one gallon of water at a temperature of 190° to 200° F. and a current density of 60 amperes per per square foot of powder area until the powder has gained the required weight of iron, the increase in weight allowed being determined by the degree of protection desired for the copper cores of the particles. Experimental and production activities to date indicate that very thin films or coatings of iron not exceeding .001 in. will give entirely satisfactory protection and it appears that this may be accomplished by a plating representing not over 10 percent of the weight of the mass and often less. The powder is preferably kept in constant motion during the plating process and the solution is maintained slightly acid by addition of HCl at suitable intervals.

At the completion of the plating step, and preparatory to the subsequent pressing and forming step or operation, the coated particles of metallic powder are, preferably, thoroughly cleaned to remove all traces of the plating solution and other foreign substances. I have found that this can be very effectively accomplished by a series of washes in hot water followed by a rinse in alcohol to dispel the water from the powder.

The next step in the preferred method or process comprises the forming of a coherent solid metal slug from a quantity of the coated or plated metallic particles, and which slug may be of rough shapes, suitable for subsequent reshaping or forming to provide a tip or tips of desired shape, or may conform to the desired finished tip shape. Broadly stated, this step comprises pressing and heating a quantity of coated metal particles, whereby to directly and metallically bond or join the metallic coatings of adjacent particles of the mass. In my experimental and production activities to date, very satisfactory results have been accomplished as follows: Working with iron coated copper powder, a suitable quantity of such powder is placed in a suitable forming die while still damp with alcohol from the aforementioned rinse, and in such condition is subjected to high pressure, such as 30 to 50 tons per square inch, for example. The compressed slugs thus produced are then sintered to form a coherent solid metal mass by transferring the same to a hydrogen atmosphere furnace, wherein they are heated to a temperature of 1800° F. to 1900° F. for a period of approximately 3 hours. The sintered slugs as removed from the hydrogen atmosphere furnace are strong and will not crush, but are somewhat porous. To increase the density of the slugs, they are preferably returned to the die before mentioned and again subject to pressure therein to approximately the degree before mentioned. During this last pressing operation, the slugs are reduced in volume by approximately 12 percent with a corresponding increase in density. The slugs are now preferably returned to the furnace and reheated to approximately 1800° F. for approximately one hour. Upon removal, the slugs are preferably again subjected to squeezing pressure in the said die and at approximately the same pressure as before. At the completion of this last or third pressing operation, the slugs will usually have a density closely approaching that of solid pure copper, and tests to date indicate that densities upward of 95 percent that of pure solid copper are not difficult to attain. Because this treatment is rather lengthy, I contemplate hot pressing of the coated metal powder in hydrogen atmosphere, since very high densities can thus be achieved in a single composite pressing and heating or sintering operation.

As previously stated, the slugs thus produced may be of rough shapes or may be die formed to finished tip shape. In the latter case, the tips are ready for application to the soldering instrument, and in the former case, the slugs will be formed to desired tip shape by filing, grinding, milling or the like. In the construction of soldering instruments of the kind illustrated in Fig. 1, the finished tips 6 are applied to the outer ends of the tubular heads 4 by brazing or the like. If desired, and preferably, the finished heads 4 complete with tips 6 are calorized or otherwise treated to protect the same against oxidation.

Although I preferably coat or plate the particles of metallic powder electrolytically, it should be appreciated, nevertheless, that other methods of plating or coating may be used, one example of such being as follows: Copper powder may be iron coated or plated by evaporating the iron from a hot source in a high vacuum and allowing it to condense on the copper particles which must be kept in motion or agitated the same as in electrolytic plating.

During the heating step or steps, the coatings of the individual particles making up the mass are united or bonded by the phenomenon known as "sintering," which is carried on well below the melting points of the metals concerned, but which, nevertheless, causes the coatings of the adjacent particles to fuse together so as to apparently eradicate any boundary therebetween. During this heating or sintering step, there will be a tendency for the copper to diffuse into the iron, and vice versa, and which, if carried on for a sufficient time at sufficient temperature, would produce a copper iron alloy layer between the particles. This transformation is objectionable, if permitted to any material extent, and for this reason, the time and temperature components are maintained as low as possible during the sintering or heating step.

If the tips are molded to finished shape, they will initially have a complete or substantially complete and unbroken iron coating over the exterior surface thereof. On the other hand, if the tips are made to rough shape and are thereafter formed to size, as by cutting, filing, grinding or the like, the working surface of the tip will then appear under magnification much like an irregular honey comb represented by cross-sections of the cores and coatings of the adjacent particles of the tip, and, of course, the same will be the case after any reshaping of the tip by an operator. This honey comb appearance may, for example, be created by filing or cutting down the working surface of the tip, as indicated by lines X—X in Fig. 2. If the tip is initially molded to shape so that its entire working surface is iron coated, as shown, for example, in Fig. 2, this iron surface may, if desired, be directly tinned or plated with molten solder and used in this condition. Since iron has a much lower rate of solubility in solder than does copper, this complete iron coating or plating will serve as a complete armor for the copper of the tip until finally dissolved away or mechanically removed in the process of shaping or reshaping the tip. Ultimately, however, the copper cores of the particles of the mass will be directly exposed to the solder and these will dissolve away at a relatively high rate, as compared to that of the iron coatings, until finally the dissolving process is retarded at the iron coatings or boundaries of the particles. If the surface of the tip is now viewed under magnification, it will appear pitted, but the pitting is so relatively fine that the working surface of the tip will actually appear smooth when tinned or plated with molten solder, which latter fills up the fine pits in the surface. In practice, it has been found that this fine pitting is actually advantageous, since the surface area is thereby increased allowing the iron to carry a greater amount of molten solder to the work involved. The iron boundaries or coatings of the now-exposed platings or coatings of the adjacent particles will, of course, be gradually attacked and eaten away by the solder, but, as previously indicated, the rate at which the tip material is dissolved away in the solder is very greatly retarded by these particle coatings or boundaries, and with the result that the useful life of tips thus made are very greatly extended as compared, for example, to tips made of pure solid copper.

Exhaustive experiments have shown that tips constructed in accordance with the present invention have a rate of thermal conductivity closely approaching that of pure solid copper, approximately 90 per cent that of pure solid copper or better being readily obtainable. Also, exhaustive experiments have shown that the useful life of tips made in accordance with the invention is very much greater than tips formed of pure solid copper. In accordance with one such experiment, two tips of identical size and shape were formed, one of solid pure copper and the other of iron-coated copper particles made in accordance with the instant invention. Each of these were then placed in a bath of molten solder for an equal period of time, after which they were removed and weighed to determine the amount that each had dissolved away in the molten solder bath. After repeating this test several times, it was found that the rate at which tips made in accordance with the invention dissolved away in molten solder was approximately ½₀ that of pure copper tips. Similar increases in the useful life of tips made in accordance with the invention, as compared to tips made of pure solid copper, have also been shown by comparative tests in evvery-day commercial service. Of course, it should be appreciated that the rate of solubility and rate of thermal conductivity of soldering iron tips made in accordance with the instant invention will vary with variations in the following, to wit:

(A) The nature of the metallic substances forming the cores and coatings of the particles of the tip mass;

(B) The average particle size of the metallic substance forming the cores of the individual particles;

(C) The thickness of the particle coatings;

(D) The density of the tip mass; and (E) The degree of diffusion between the particle core metal and the particle coating metal.

What I claim is:

1. In a soldering instrument a tip capable of reshaping comprised of a coherent solid metal mass having many particles, said particles each comprising a metal core of group consisting of copper and silver and a relatively thin metal coating of group consisting of iron and nickel, the metal cores having a relatively high rate of heat conductivity accompanied by a relatively high rate of solubility in a solder of the type to be used in connection therewith, the metal coatings having a relatively low rate of solubility in such solder, and the metal coatings of adjacent particles of the mass being directly and metallically bonded to one another.

2. The structure defined in claim 1, wherein the metal core of each particle is composed of copper and the coating thereon is composed of iron.

3. The structure defined in claim 1, wherein the metal core of each particle is composed of copper and the coating thereon is composed of nickel.

4. The structure defined in claim 1, wherein the metal core of each particle is composed of silver and the coating thereon is composed of iron.

5. The structure defined in claim 1, wherein the metal core of each particle is composed of silver and the coating thereon is composed of nickel.

References Cited in the file of this patent

UNITED STATES PATENTS

| Number | Name | Date |
|---|---|---|
| 316,278 | Mactear | Apr. 21, 1885 |
| 1,541,301 | White | June 9, 1925 |
| 1,986,197 | Harshaw | Jan. 1, 1935 |
| 2,004,708 | Pfanstiehl | June 11, 1935 |
| 2,175,849 | Kelley | Oct. 10, 1939 |
| 2,175,899 | Kelley | Oct. 10, 1939 |
| 2,246,462 | Darby | June 17, 1941 |
| 2,311,776 | Powell | Feb. 23, 1943 |
| 2,324,802 | Powell | July 20, 1943 |
| 2,370,400 | Graves | Feb. 27, 1945 |
| 2,376,706 | Lum | May 22, 1945 |